United States Patent
Rowlands et al.

(10) Patent No.: US 6,748,495 B2
(45) Date of Patent: Jun. 8, 2004

(54) RANDOM GENERATOR

(75) Inventors: Joseph B. Rowlands, Santa Clara, CA (US); Chun H. Ning, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 413 days.

(21) Appl. No.: 09/858,804

(22) Filed: May 15, 2001

(65) Prior Publication Data

US 2002/0188808 A1 Dec. 12, 2002

(51) Int. Cl.[7] .............................. G06F 12/00
(52) U.S. Cl. .................. 711/133; 711/128; 711/134; 711/136; 711/159; 711/160
(58) Field of Search ................ 711/133, 134, 711/128, 136, 159, 160

(56) References Cited

U.S. PATENT DOCUMENTS

| | | |
|---|---|---|
| 3,693,165 A | 9/1972 | Reiley et al. |
| 4,044,338 A | 8/1977 | Wolf |
| 4,453,212 A | 6/1984 | Gaither et al. |
| 4,511,994 A | 4/1985 | Webb et al. |
| 4,575,792 A | 3/1986 | Keeley |
| 4,633,440 A | 12/1986 | Pakulski |
| 4,654,778 A | 3/1987 | Chiesa et al. |
| 4,807,115 A | 2/1989 | Torng |
| 4,833,642 A | 5/1989 | Ooi |
| 4,858,105 A | 8/1989 | Kuriyama et al. |

(List continued on next page.)

FOREIGN PATENT DOCUMENTS

| | | |
|---|---|---|
| EP | 0 061 570 | 10/1982 |
| EP | 0 259 095 | 3/1988 |
| EP | 325 420 | 7/1989 |
| EP | 0 381 471 | 8/1990 |
| EP | 0 436 092 | 7/1991 |
| EP | 0 459 232 | 12/1991 |
| EP | 0 459 233 | 12/1991 |
| EP | 0 568 221 | 11/1993 |
| EP | 0 687 979 | 12/1995 |
| EP | 997 821 | 5/2000 |
| EP | 03010901.1 | 9/2003 |
| GB | 2 214 336 | 8/1989 |
| GB | 2 263 985 | 8/1993 |
| GB | 2 263 987 | 8/1993 |
| GB | 2 281 422 | 3/1995 |

OTHER PUBLICATIONS

Pub. No. U.S. 2003/0093644, May 15, 2003, Fanning, Cache line replacement policy.*
Pub. NO. U.S. 2003/0023827, Jan. 30, 2003, Palanca et al, Cache replacement for multiple way–cache.*

(List continued on next page.)

*Primary Examiner*—Donald Sparks
*Assistant Examiner*—Ngoc V Dinh
(74) *Attorney, Agent, or Firm*—Lawrence J. Merkel

(57) ABSTRACT

A random number generator circuit includes a primary circuit configured to generate a value within a first range and a secondary circuit configured to generate a value within a second range. A detector circuit detects whether or not the value from the primary circuit is within the desired output range for the random number generator circuit, and selects either the value from the primary circuit or the value from the secondary circuit in response. The second range is the desired output range and the first range encompasses the second range. In one embodiment, the primary circuit has complex harmonics but may generate values outside the desired range. The secondary circuit may have less complex harmonics, but may generate values only within the desired range. In one implementation, the random number generator circuit is used to generate a replacement way for a cache.

22 Claims, 9 Drawing Sheets

U.S. PATENT DOCUMENTS

| | | | |
|---|---|---|---|
| 4,907,278 | A | 3/1990 | Cacinati et al. |
| 4,996,641 | A | 2/1991 | Talgam et al. |
| 5,113,514 | A | 5/1992 | Albonesi et al. |
| 5,125,083 | A | 6/1992 | Fite et al. |
| 5,163,142 | A | 11/1992 | Mageau |
| 5,193,163 | A | 3/1993 | Sanders et al. |
| 5,226,126 | A | 7/1993 | McFarland et al. |
| 5,226,130 | A | 7/1993 | Favor et al. |
| 5,241,663 | A | 8/1993 | Rohwer |
| 5,303,362 | A | 4/1994 | Butts, Jr. et al. |
| 5,317,716 | A | 5/1994 | Liu |
| 5,325,504 | A | 6/1994 | Tipley et al. |
| 5,353,425 | A | 10/1994 | Malamy et al. |
| 5,369,753 | A | 11/1994 | Tipley |
| 5,377,345 | A | 12/1994 | Chang et al. |
| 5,416,783 | A | 5/1995 | Broseghini et al. |
| 5,432,918 | A | 7/1995 | Stamm |
| 5,450,551 | A | 9/1995 | Amini et al. |
| 5,471,598 | A | 11/1995 | Quattromani et al. |
| 5,487,162 | A | 1/1996 | Tanaka et al. |
| 5,493,667 | A | 2/1996 | Huck et al. |
| 5,510,934 | A | 4/1996 | Brennan et al. |
| 5,526,510 | A | 6/1996 | Akkary et al. |
| 5,539,878 | A | 7/1996 | Kikinis |
| 5,551,001 | A | 8/1996 | Cohen et al. |
| 5,557,763 | A | 9/1996 | Senter et al. |
| 5,564,034 | A | 10/1996 | Miyake |
| 5,584,014 | A | 12/1996 | Nayfeh et al. |
| 5,586,253 | A | 12/1996 | Green et al. |
| 5,586,293 | A | 12/1996 | Baron et al. |
| 5,588,126 | A | 12/1996 | Abramson et al. |
| 5,592,679 | A | 1/1997 | Yung |
| 5,638,537 | A | 6/1997 | Yamada et al. |
| 5,644,752 | A | 7/1997 | Cohen et al. |
| 5,668,815 | A | 9/1997 | Gittinger et al. |
| 5,668,972 | A | 9/1997 | Liu et al. |
| 5,671,444 | A | 9/1997 | Akkary et al. |
| 5,748,640 | A | 5/1998 | Jiang et al. |
| 5,752,261 | A | 5/1998 | Cochcroft, Jr. |
| 5,761,712 | A | 6/1998 | Tran et al. |
| 5,768,555 | A | 6/1998 | Tran et al. |
| 5,784,588 | A | 7/1998 | Leung |
| 5,787,490 | A | 7/1998 | Ozawa |
| 5,802,338 | A | 9/1998 | Rechtschaffen et al. |
| 5,809,528 | A | 9/1998 | Miller et al. |
| 5,809,531 | A | 9/1998 | Brabandt |
| 5,875,465 | A * | 2/1999 | Kilpatrick et al. .......... 711/134 |
| 5,913,224 | A | 6/1999 | MacDonald |
| 5,974,507 | A | 10/1999 | Arimilli et al. |
| 5,983,321 | A | 11/1999 | Tran et al. |
| 6,026,461 | A | 2/2000 | Baxter et al. |
| 6,047,358 | A * | 4/2000 | Jacobs ....................... 711/133 |
| 6,115,792 | A | 9/2000 | Tran |
| 6,148,370 | A | 11/2000 | Kobayashi |
| 6,161,167 | A | 12/2000 | Witt |
| 6,185,657 | B1 | 2/2001 | Moyer |
| 6,185,703 | B1 | 2/2001 | Guddat et al. |
| 6,237,083 | B1 | 5/2001 | Favor |
| 6,240,432 | B1 | 5/2001 | Chuang et al. |
| 6,240,532 | B1 | 5/2001 | Cho |
| 6,263,082 | B1 | 7/2001 | Ishimoto et al. |
| 6,269,427 | B1 | 7/2001 | Kuttanna et al. |
| 6,295,608 | B1 | 9/2001 | Parkes et al. |
| 6,351,789 | B1 | 2/2002 | Green |
| 6,405,287 | B1 * | 6/2002 | Lesartre ...................... 711/128 |

OTHER PUBLICATIONS

SiByte, "Target Applications, " http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB–1 CPU, Oct. 2000, rev. 0.1, 1 page.

SiByte, "Fact Sheet," SB–1250, Oct. 2000, rev. 0.2, 10 pages.

Stepanian, SiByte, SiByte SB–1 MIPS64 CPU Core, Embedded Processor Forum 2000, Jun. 13, 2000, 15 pages.

Jim Keller, "The Mercurian Processor: A High Performance, Power–Efficient CMP for Networking," Oct. 10, 2000, 22 pages.

Tom R. Halfhill, "SiByte Reveals 64–Bit Core For NPUs: Independent MIPS64 Design Combines Low Power, High Performance," Microdesign Resources, Jun. 2000, Microprocessor Report, 4 pages.

Gallup, et al., "Testability Features of the 68040," Motorola, Inc., 1990 International Test Conference, IEEE, pp. 749–757.

Hollenbeck, et al., "PA7300LC Integrates Cache for Cost/Performance," Hewlett Packard Company, IEEE, 1996, pp. 167–174.

*Intel® StrongARM® SA–1100 Microprocessor, Developer's Manual*, Aug. 1999, © Intel Corporation, Ch. 1, p. 6; Ch. 2, p. 2; Ch. 6, pp. 2–5; Ch. 7, p. 3.

Cyrix® 5x86 Microprocessor, Jul. 1995, 8 pgs.

Cyrix® 6x86 Microprocessor, Aug. 1995, 6 pgs.

"Memory Arbitration with Out of Order Execution in Conjunction with a RISC System," IBM Technical Disclosure Bulletin, Sep. 1992, pp. 62–64.

"Handling Reservations in Multiple–Level Cache," IBM Technical Disclosure Bulletin, Dec. 1993, pp. 441–446.

Dekker et al., "A Realistic Fault Model and Test Algorithms for Static Random Access Memories," IEEE Transactions on Computer–Aided Design, vol. 9, No. 6, Jun. 1990, pp. 567–572.

* cited by examiner

RANDOM GENERATOR

BACKGROUND OF THE INVENTION

1. Field of the Invention

This invention is related to random number generator circuits and pseudo-random number generator circuits and, more particularly, to a random number generator circuit for generating a random replacement way for a cache.

2. Description of the Related Art

Random number generator circuits have a variety of uses in various circuits, such as integrated circuits. For example, random number generator circuits may be used, in a set associative cache, to select a random replacement way from which to evict data in order to store a newly fetched cache line (in response to a cache miss). A random number generator circuit could be addressable via instructions in a processor to provide a random number for software use. For example, various games and other applications may benefit from being able to read a random number generator circuit rather than using a complex software routine to generate a random number. Other hardware uses may include random selection of one of several eligible units to execute an instruction, random translation lookaside buffer entry replacement, random branch history buffer or target address buffer replacement in a branch predictor, etc.

The random number generator circuits are typically pseudo-random circuits, in which the circuits attempt to generate a relatively unpredictable sequence of numbers over time (when viewed from the consumer of the numbers) using some sort of deterministic algorithm. However, for brevity herein, these circuits will be referred to as random number generator circuits. Generally, it is desirable that the algorithm produce a long sequence of numbers before any repeated patterns are experienced, either in the values used in the algorithm or in the output random number values. The number of values produced before a repeat is referred to as a harmonic of the random number generator, and producing one or more long sequences (high harmonics) may be referred to as complex harmonics. It may generally be desirable to produce large, odd numbered harmonics, prime number harmonics, etc. to improve the apparent randomness of the generated numbers.

Algorithms having complex harmonics tend to reduce the occurrence of degenerative cases in which the same random number is generated repeatedly over a relatively short period of time, or the same random number is generated with a short, consistent frequency over a short period of time. For example, in the cache replacement scheme mentioned above, if a cache miss in a given set occurs with a frequency that matches a harmonic of the random number generator, then the same way would be replaced in the set each time where it may be desirable, in general, to replace different ways in the set for each miss to replace less recently accessed data in the set with the more recently accessed data. In a simple example, if a miss within a given set occurs every fourth miss (or frequently the fourth miss) during a certain period of time and every fourth value of the random number generator is the same during the period (or mostly the same), then the same way is replaced in that set during the time period.

Generally, the random number generator circuit may produce a random number within a range of integers. For example, a four way set associative cache having random replacement may include a random number generator circuit which produces a way value (an integer in the range from 0 to 3). A three way set associative cache would have a random number generator which produces an integer in the range of 0 to 2. Thus, the range required of a given random number generator circuit may be arbitrary.

SUMMARY OF THE INVENTION

A random number generator circuit includes a primary circuit configured to generate a value within a first range and a secondary circuit configured to generate a value within a second range. A detector circuit detects whether or not the value from the primary circuit is within the desired output range for the random number generator circuit, and selects either the value from the primary circuit or the value from the secondary circuit in response. The second range (from which the value from the secondary circuit is generated) is the desired output range and the first range encompasses the second range.

In one embodiment, the primary circuit has complex harmonics but may generate values outside the desired range. The secondary circuit may have less complex harmonics, but may generate values only within the desired range. The combination of the primary circuit and the secondary circuit may have complex harmonics and may generate values only within the desired range. In one specific implementation, the primary circuit may generate values within a range of a power of two. For example, a linear feedback shift register (LFSR) may be the primary circuit and a counter may be the secondary circuit.

In one implementation, the random number generator circuit is used to generate a replacement way for a cache. The cache may have a number of ways which is not a power of two, or may be programmable to disable one or more ways. In either case, the random number generator may be used to generate replacement ways with complex harmonics.

Broadly speaking, a circuit is contemplated comprising a first circuit, a second circuit, and a detector circuit. The first circuit is configured to generate a first value within a first predetermined range of values. The second circuit is configured to generate a second value within a second range of values, wherein the second range is encompassed by the first predetermined range. The detector circuit is coupled to receive the first value, wherein the detector circuit is configured to detect whether or not the first value is within the second range. The detector circuit is configured to select the first value as an output of the circuit unless the first value is out of the second range. Furthermore, the detector circuit is configured to select the second value as the output if the first value is out of the second range.

Additionally, a cache is contemplated comprising a memory array and a replacement circuit. The memory array is arranged in an N way set associative configuration, N being a positive integer greater than 1. Coupled to select a replacement way of the N ways, the replacement circuit comprises a first circuit configured to generate a first value indicative of a first way, a second circuit configured to generate a second value indicative of one of the N ways, and a detector circuit coupled to receive the first value. The one of the N ways indicated by the second value is selectable as a replacement way. The detector circuit is configured to detect whether or not the first way is within the range of ways selectable as the replacement way. In response, the detector circuit is configured to select the first value as an output of the replacement circuit unless the first way is out of the range, and to select the second value as the output if the first value is out of the range.

Moreover, a method is contemplated. A first value within a first predetermined range of values is generated. A second value within a second range of values is generated. The second range is encompassed by the first predetermined range. Whether or not the first value is within the second range is detected. The first value is selected unless the first value is out of the second range. The second value is selected if the first value is out of the second range.

BRIEF DESCRIPTION OF THE DRAWINGS

The following detailed description makes reference to the accompanying drawings, which are now briefly described.

Figure 1:
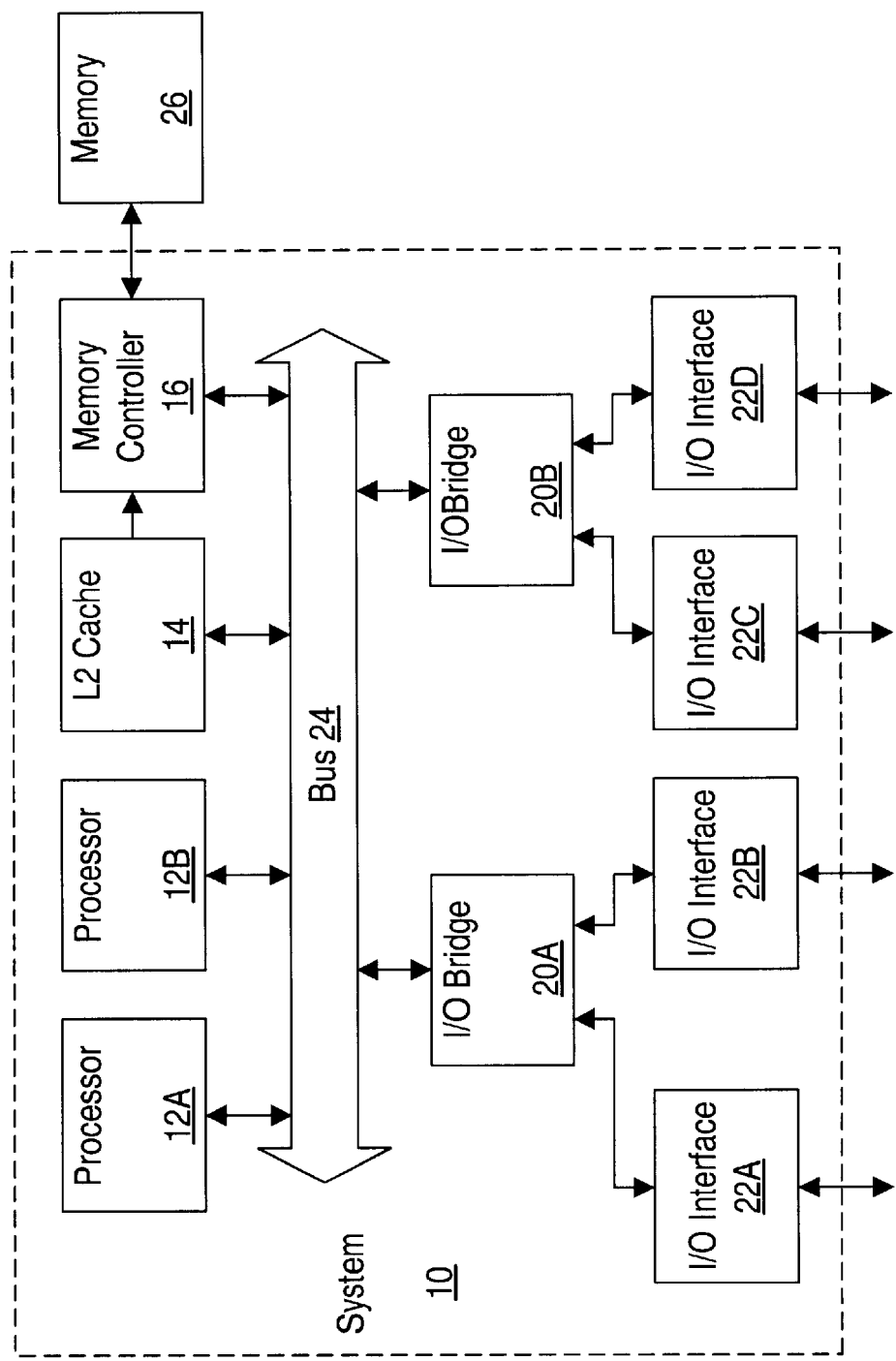
FIG. 1 is a block diagram of one embodiment of a system including an L2 cache.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. As illustrated in FIG. 1, each of processors 12A–12B, L2 cache 14, memory controller 16, and I/O bridges 20A–20B are coupled to bus 24. Thus, each of processors 12A–12B, L2 cache 14, memory controller 16, and I/O bridges 20A–20B may be an agent on bus 24 for the illustrated embodiment. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. While system 10 as shown in FIG. 1 includes two processors, other embodiments may include one processor or more than two processors, as desired.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be an outer level cache than L2. L2 cache 14 may employ any organization, including direct mapped, set associative, and fully associative organizations. In one particular implementation, L2 cache 14 may be a set associative cache (in general N way, N being an integer, although specific 3 way and 4 way embodiments are illustrated below) having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. Other embodiments may not include L2 cache 14 and memory controller 16 may respond to each memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for I/O bridge 20A and I/O interfaces 22C–22D for I/O bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that I/O interface 22A–22B. Similarly, I/O bridge 20B generally performs transactions on bus 24 on behalf of I/O interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) I/O fabric developed by Advanced Micro Devices, Inc. (e.g. I/O interface 22B). Other I/O interfaces may be bridged by I/O bridge 20B. Other implementations may bridge any combination of I/O interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

Bus 24 may be a split transaction bus, in one embodiment. Bus 24 may employ a distributed arbitration scheme, in one embodiment. In one embodiment, bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that system 10 (and more particularly processors 12A–12B, L2 cache 14, memory controller 16, I/O interfaces 22A–22D, I/O bridges 20A–20B and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 24 may not be pipelined, if desired.

It is noted that, while FIG. 1 illustrates I/O interfaces 22A–22D coupled through I/O bridges 20A–20B to bus 24, other embodiments may include one or more I/O interfaces directly coupled to bus 24, if desired.

As used herein, the term "memory transaction" refers to a communication between a device and the memory system. The memory transaction includes an address identifying a storage location in the memory. In the illustrated embodiment, the memory transaction is transmitted on bus 24 to memory controller 16 (and may be serviced by L2 cache 14 instead of memory controller 16). However, other systems may use other communications media (e.g. packet based transmission, clock-forwarded links, point to point interconnect, etc.). Memory transactions may include read transactions (a transfer of data from memory to the device) and write transactions (a transfer of data from the device to memory). More generally, a read transaction may be a transfer of data from a target of the transaction to the source (or initiator) of the transaction and a write transaction may be a transfer of data from a source of the transaction to the target of the transaction.

L2 Cache, First Embodiment

Figure 2:
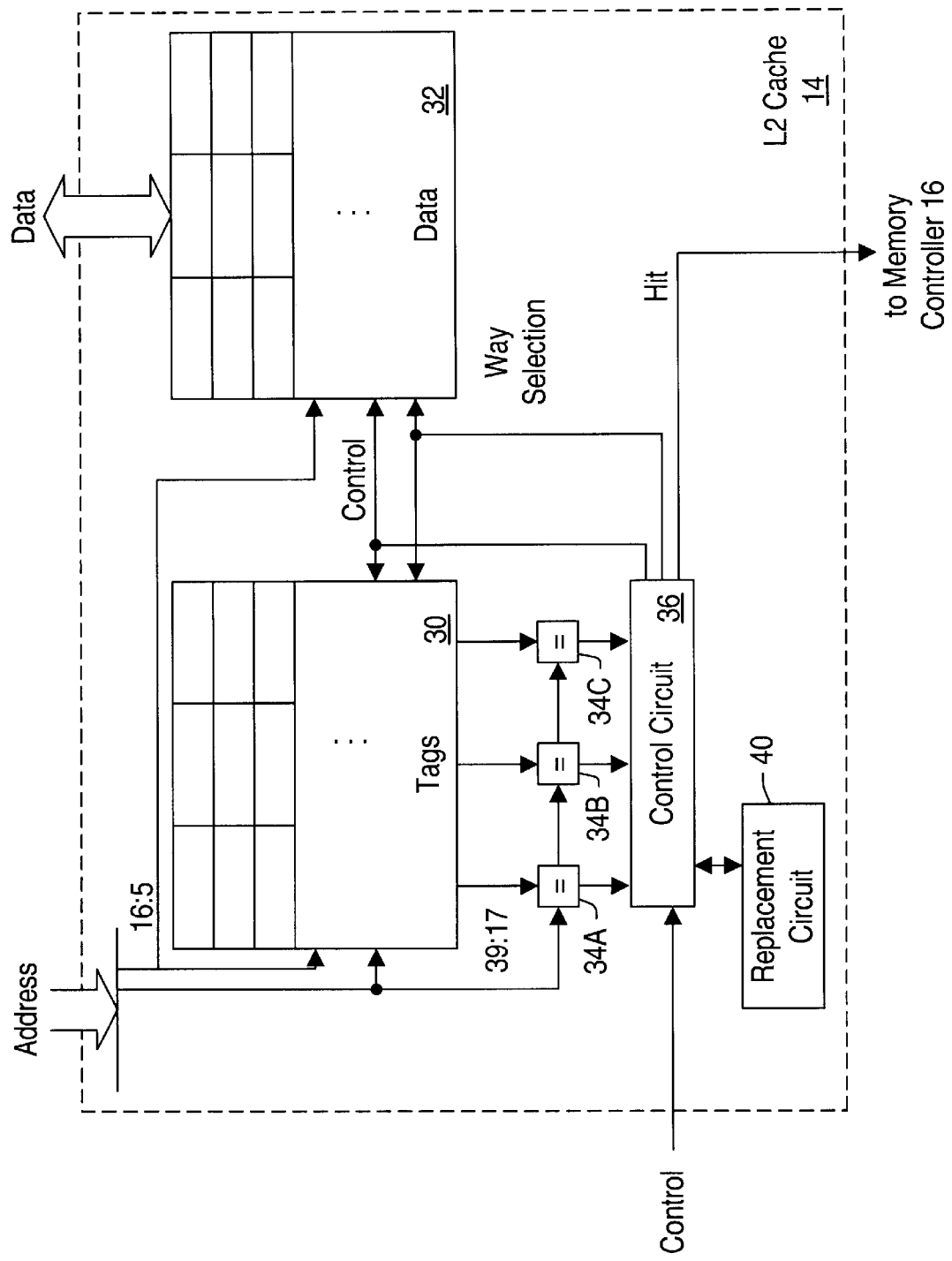
FIG. 2 is a block diagram of one embodiment of the L2 cache shown in FIG. 1.

Turning now to FIG. 2, a block diagram of one embodiment of L2 cache 14 is shown. Other embodiments are possible and contemplated. In the embodiment of FIG. 2, L2 cache 14 includes a tags memory 30, a data memory 32, a set of comparators 34A–34C, a control circuit 36, and a replacement circuit 40. Tags memory 30 and data memory 32 are each coupled to receive an index portion of an address of a transaction (the address of the transaction may be referred to more briefly herein as an "input address" to the L2 cache 14). Data memory 32 is coupled to receive and provide data corresponding to the transaction. Tags memory 30 is further coupled to receive a tag portion of the input address, and is coupled to comparators 34A–34C. Comparators 34A–34C are further coupled to receive the tag portion of the input address and are coupled to control circuit 36. Control circuit 36 is coupled to receive control information corresponding to the transaction and is further coupled to the replacement circuit 40 and to provide a hit signal output from the L2 cache 14 (e.g. to memory controller 14, in the illustrated embodiment). Control circuit 36 is further coupled to provide a way selection and control signals to tags memory 30 and data memory 32.

In the illustrated embodiment, L2 cache 14 is a three way set associative cache and employs a random replacement policy. Replacement circuit 40 selects the replacement way for a cache miss, and thus includes a random number generator circuit which generates an indication of the replacement way (e.g. an integer in the range of 0–2). As will be described in more detail below, the replacement circuit includes a primary circuit which generates a random number within a first range (e.g. 0–3) and a secondary circuit which generates a random number within a second range (e.g. 0–2). The primary circuit may exhibit complex harmonics, but may generate a value which does not correspond to one of the ways of L2 cache 14. The secondary circuit may not exhibit as complex a harmonic as the primary circuit, but may limit its output to the range desired from the random number generator. When the value generated by the primary circuit is out of the desired range, a detector circuit in the replacement circuit 40 may select the output of the secondary circuit as the output of the random number generator. When the value generated by the primary circuit is in the desired range, the output of the primary circuit may be selected by the detector circuit. The combination of the primary and secondary circuits may exhibit complex harmonics while still providing an output in the desired range.

The replacement way is the way from which a cache line is evicted to provide space for the cache line corresponding to a cache miss. Control circuit 36 may cause the cache line in the replacement way to be evicted (invalidating the tag and writing the evicted cache line back to memory 26, if dirty).

Generally, tags memory 30 stores the tag information for each entry in L2 cache 14, and data memory 32 stores the cache line of data for each entry in L2 cache 14. Thus, an entry of L2 cache 14 comprises a tag memory storage location and a data memory storage location. The tag memory storage location stores the tag for the entry (and possibly other information, such as validity and dirty information). For example, in one implementation, a tag for an entry includes the tag portion of the address (e.g. bits 39:17 in the illustrated embodiment), a valid bit indicating the validity or lack of validity of the entry, and a dirty bit indicating the dirty or clean state of the cache line. A cache line is dirty if at least one byte of the cache line has been modified in L2 cache 14 and the modification has not been written to memory. The data memory storage location stores the cache line of data in the entry.

During a transaction, the index portion of the input address (e.g. bits 16:5 in the illustrated embodiment) is provided to tags memory 30 and data memory 32. Each memory selects a set of storage locations in response to the index. Tags memory 30 outputs the tag from each selected storage location to comparators 34A–34C, which compare the tags to the tag portion of the input address. If the tag compares equally, and the entry is valid, the corresponding comparator 34A–34C may signal a hit to control circuit 36. Control circuit 36 may assert the hit signal to memory controller 16 if any of the comparators 34A–34C indicates a hit, and may determine a way selection from the output of comparators 34A–34C as well. Each comparator 34A–34C is comparing the tag from a different way of L2 cache 14, and thus the comparator output indicating a hit is an indication of the hitting way. Control circuit 36 provides the way selection to tags memory 30 and data memory 32. In the case of a miss, control circuit 36 provides the replacement way selection to tags memory 30 and data memory 32 during the read used to evict the cache line.

Data memory 32 provides data from the storage location at the selected index and way, or receives data into that storage location, depending upon whether the transaction is a read or write. Control circuit 36 receives the control information corresponding to the transaction, and generates control signals for data memory 32 and tags memory 30. The control signals may include, for example, an enable signal and a read/write signal to indicate whether the memory is to read or write.

Tags memory 30 may be updated in response to the transaction as well. For example, if the transaction is a write, the dirty bit in the hitting entry may be updated. Additionally, if the transaction is a miss in L2 cache 14 and is cacheable, the tags memory 30 may be updated to invalidate the evicted cache line indicated by the replacement way, as mentioned above. It is noted that tag updates and evictions may not occur in the same clock cycle that L2 cache 14 is accessed to determine the hit/miss of the input address, in some embodiments.

It is noted that, while the cache shown in FIG. 2 is described as an embodiment of L2 cache 14, the cache may be used as any cache (e.g. as an L1 cache in processors 12A or 12B, an L3 cache, etc.). Generally, the cache of FIG. 2 may respond to a cache access including the input address (e.g. a transaction in the case of L2 cache 14, or an access by the processor in the case of an L1 cache, etc.).

It is noted that the embodiment illustrated in FIG. 2 shows various exemplary address bit ranges for a particular implementation of the L2 cache (e.g. 3 way set associative, 384 kilobytes, with 32 byte cache lines) and the size of the addresses provided on bus 24. Other embodiments may vary any of these features and the bit ranges may be updated accordingly. For example, if the size of the cache is increased and the number of ways remains the same, the index bit range may be expanded (and the tag range reduced). The size of the address (40 bits in the illustrated embodiment) may be varied, affecting the bit ranges appropriately as well. Furthermore, the bit ranges may be selected differently in different implementations, according to design choice.

It is noted that, while tags memory 30 and data memory 32 are illustrated separately in FIG. 2, these memories may be integrated if desired. Generally, tags memory 30 and data memory 32 may form a memory for storing tags and corresponding cache lines of data, whether the memory is divided into portions as illustrated or is a single integrated memory.

It is noted that FIG. 2 illustrates address, data, and control signals being supplied to the L2 cache circuitry. L2 cache 14 may include buffers or queues (not shown) to capture address and data portions of transactions. The supplied address, data, and control signals may correspond to the transaction at the head of the buffers or queues.

Figure 3:
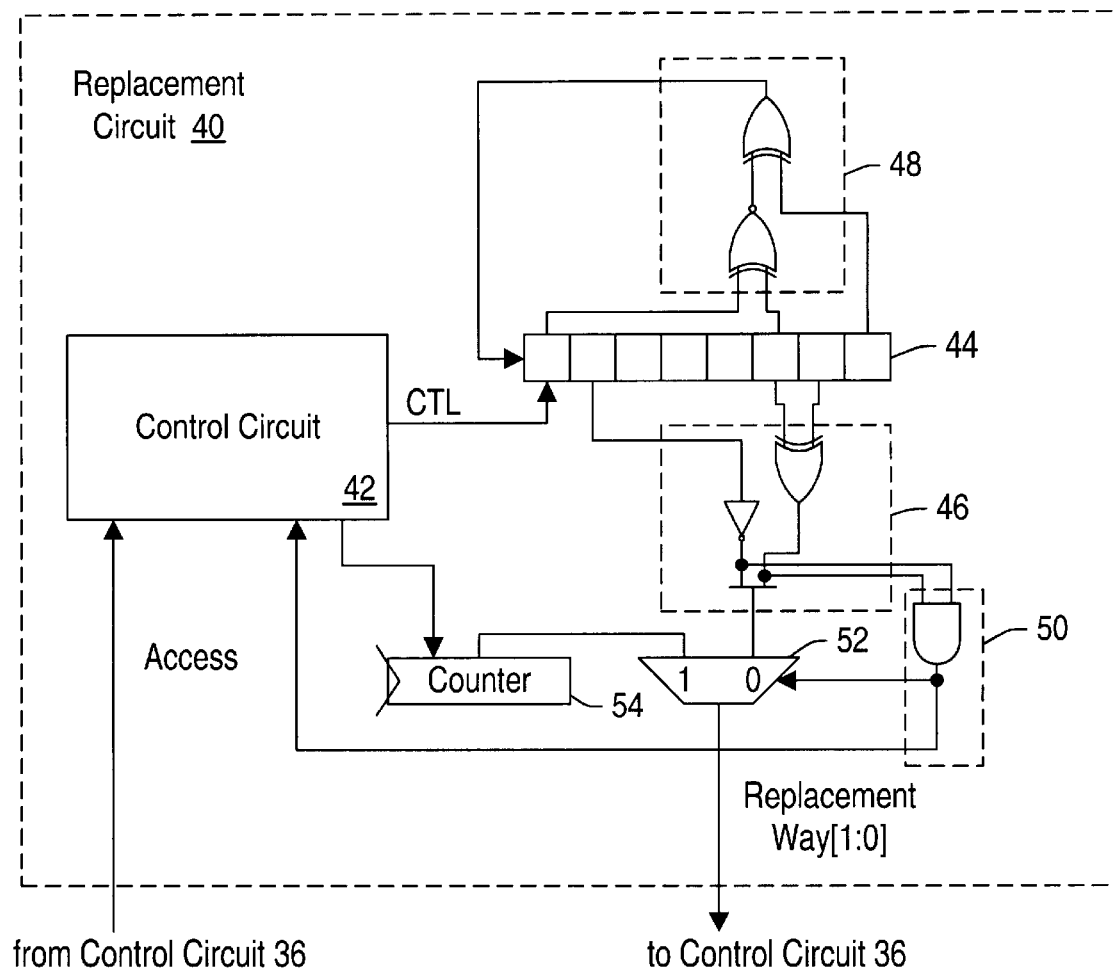
FIG. 3 is a block diagram of one embodiment of a replacement circuit shown in FIG. 2

Turning now to FIG. 3, a block diagram of one embodiment of replacement circuit 40 is shown. Other embodiments are possible and contemplated. In the embodiment of FIG. 3, replacement circuit 40 includes a control circuit 42, a register 44, an output circuit 46, a next state circuit 48, a detector circuit 50, an output multiplexor (mux) 52, and a counter 54. Control circuit 42 is coupled to receive an access signal from control circuit 36 and is coupled to provide control signals to register 44, which is coupled to output circuit 46 and next state circuit 48. Output circuit 46 is coupled to provide a replacement way to mux 52, and is coupled to detector circuit 50, which is coupled to provide a selection control signal to mux 52. Mux 52 is further coupled to counter 54, which is further coupled to control circuit 36.

Generally, replacement circuit 40 provides a replacement way to control circuit 36 for use in evicting a cache line if a miss is detected. As mentioned above, replacement circuit 40 includes a primary circuit and a secondary circuit for generating the replacement way. In the embodiment of FIG. 3, the primary circuit comprises register 44, output circuit 46, and next state circuit 48 and the secondary circuit comprises counter 54. Register 44 stores a state of the primary circuit, and output circuit 46 generates a replacement way from the state. More particularly, output circuit 46 may logically combine various bits from register 44 to generate the replacement way. The logic gates and bits combined by the logic gates as illustrated in output circuit 46 are merely exemplary. Any bits may be combined in any logic equation to generate the replacement way. Furthermore, embodiments are contemplated in which bits from register 44 are used directly as an output (i.e. output circuit 46 is simply wires connected to bits of the register 44).

In the illustrated embodiment, replacement circuit 40 changes state for each access of L2 cache 14 (irrespective of whether or not the access hits or misses). Thus, control circuit 36 signals replacement circuit 40 if an access is received by L2 cache 14 via the access signal. Alternatively, replacement circuit 40 may change state only in response to cache misses, and thus may receive an indication of a cache miss from control circuit 36. Control circuit 42 may cause register 44 to capture a new state in response to the access signal. More particularly, register 44 may be a linear feedback shift register (LFSR). In an LFSR, the next value of the register is determined as a function of the current value. Next state circuit 48 may generate a bit to be shifted into register 44, and the remaining bits may be shifted to the right (as illustrated in FIG. 3), with the rightmost bit being deleted from register 44. Control circuit 42 may assert a shift control signal to register 44, causing register 44 to shift in the bit from next state circuit 48 and shift the remaining bits. The logic gates and bits combined by the logic gates as illustrated in next state circuit 48 are merely exemplary. Any bits may be combined in any logic equation to generate the next state. Generally, the combination of output circuit 46 and next state circuit 48 may be selected so that the distribution of ways selected over time exhibits complex harmonics (or, viewed in another way, that the values recorded by register 44 over time exhibits complex harmonics).

Counter 54 may be a counter configured to increment through a range of values (corresponding to the ways of L2 cache 14) in numerical order (or alternatively, decrement through the range of values corresponding to the ways of L2 cache 14 in numerical order). For example, for the embodiment of FIGS. 2 and 3, counter 54 may be a two bit counter which increments from 0 to 1 to 2 and then back to zero again. The logic equations for the next state of the counter 54 for such an embodiment may be (where: (i) Next_counter[n] is the next state of bit n in counter 54; (ii) Counter[n] is the current state of bit n in the counter 54; and (iii) the next state is assumed in response to an increment control signal from control circuit 42):

Next_counter[0]=!Counter[0] & !Counter[1]

Next_counter[1]=Counter[0] & !Counter[1]

While the LFSR may provide complex harmonics for the selected replacement way, output circuit 46 may generate a replacement way value which does not correspond to one of the ways of L2 cache 14. Particularly, the LFSR generates a two bit replacement way in the present embodiment, and values of the LFSR may cause the replacement way to be '11' in binary (or 3). However, the embodiment of L2 cache 14 shown in FIG. 2 includes only ways 0, 1, and 2.

Detector circuit 50 receives the replacement way value generated by output circuit 46 and determines if the replacement way is a way of L2 cache 14. If the replacement way identifies a way of L2 cache 14, then detector circuit 50 selects the replacement way from output circuit 46 through mux 52. If the replacement way generated by output circuit 46 is not a way of L2 cache 14, then detector circuit 50 selects the output of the counter 54 through mux 52. Thus, for the illustrated embodiment, detector circuit 50 may be an AND gate anding the bits of the replacement way generated by output circuit 46 to produce the selection control for mux 52 (wherein the 0 state of the selection control signal causes the selection of the replacement way from output circuit 46 and the 1 state causes the selection of the replacement way indicated by counter 54, although the sense of the selection signal may be reversed).

Counter 54 may be updated in response to its output being selected by detector circuit 50. Thus, control circuit 42 may receive the selection control signal output by detector circuit 50 and may signal counter 54 to increment in response to the selection control signal being asserted and an access occurring (or a miss occurring, depending on the embodiment). In this case, the frequency of each of the three ways being selected may be approximately 25% (¼ of the values generated by the LFSR)+⅓* 25% (⅓ of the times the counter is used), or 33%. Thus, the frequency of each way selection may be approximately equal, while complex harmonics may still be achieved. While the harmonics of counter 54 alone may not be complex, the combination of counter 54 and the LFSR as described above may have complex harmonics. It is noted that, in other embodiments, the counter 54 may be incremented even if its value is not selected. In such embodiments, the frequency of occurrence of each way may not be equal.

It is noted that, while the LFSR generates a value within a range of 0–3, other embodiments may generate values within any range corresponding to a power of 2 and may exhibit complex harmonics. Such embodiments may be used for larger set associativities. Any set associativity (N) may be supported with a combination of the LFSR and the counter, where the counter increments or decrements through the range 0 to N−1 and the LFSR generates values in a range which encompasses 0 to N−1. A range is said to "encompass" another range if the range includes each value in the other range. The range may or may not include additional values. As used herein, a "range" of values is the set of all values which may be generated by the corresponding circuit. The range may or may not be contiguous values.

While the random number generator circuit described above is described in the context of selecting a random replacement way, the random generator circuit may be used for any type of random number generation, as desired. It is noted that, while an LFSR is used as the primary circuit herein, any circuit which exhibits complex harmonics may be used. Similarly, while a counter circuit is used for the secondary circuit in the above embodiment, any circuit may be used. Alternatively, the primary circuit may not, in itself, exhibit complex harmonics but the combination of the primary and secondary circuits may exhibit complex harmonics.

Figure 4:
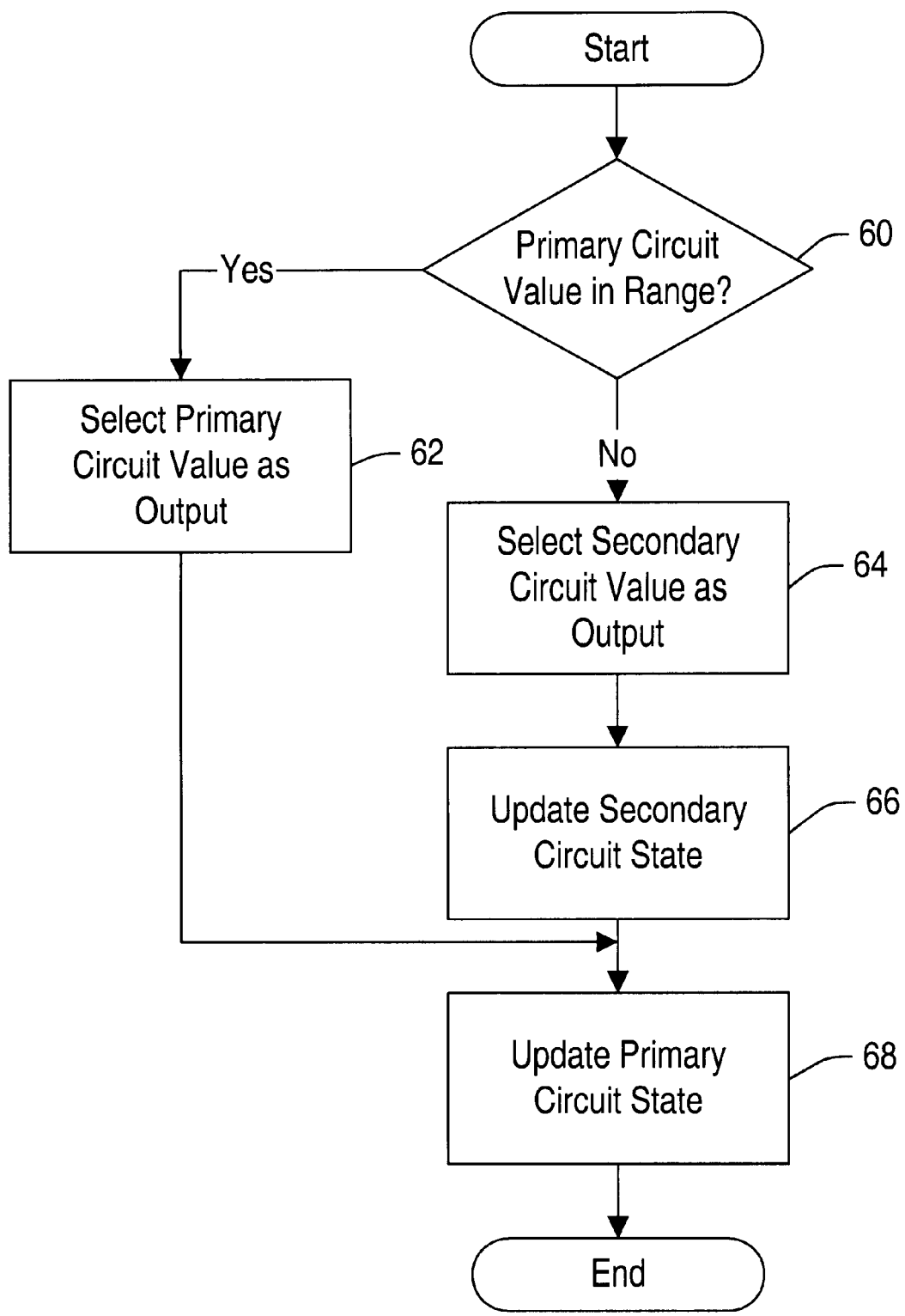
FIG. 4 is a flowchart illustrating operation of one embodiment of a general random number generator circuit which may be included in the replacement circuit shown in FIG. 3.

FIG. 4 is a flowchart illustrating the general operation of one embodiment of a random number generator circuit having primary and secondary circuits in response to a request for a random number generation. Other embodiments are possible and contemplated. While the blocks shown in FIG. 4 are illustrated in a particular order for ease of understanding, any order may be used. Furthermore, blocks may be performed in parallel in combinatorial logic circuitry within the random number generator circuit.

The detector circuit in the random generator circuit determines if the value generated by the primary circuit is within the desired range (decision block 60). If so, the primary circuit's value is selected as the output random number (block 62). On the other hand, if the primary circuit's value is not within the desired range, the secondary circuit's value is selected as the output random number (block 64) and the secondary circuit's state is updated to generate the next value (block 66). In either case of decision block 60, the primary circuit's state is updated (block 68).

Figure 5:
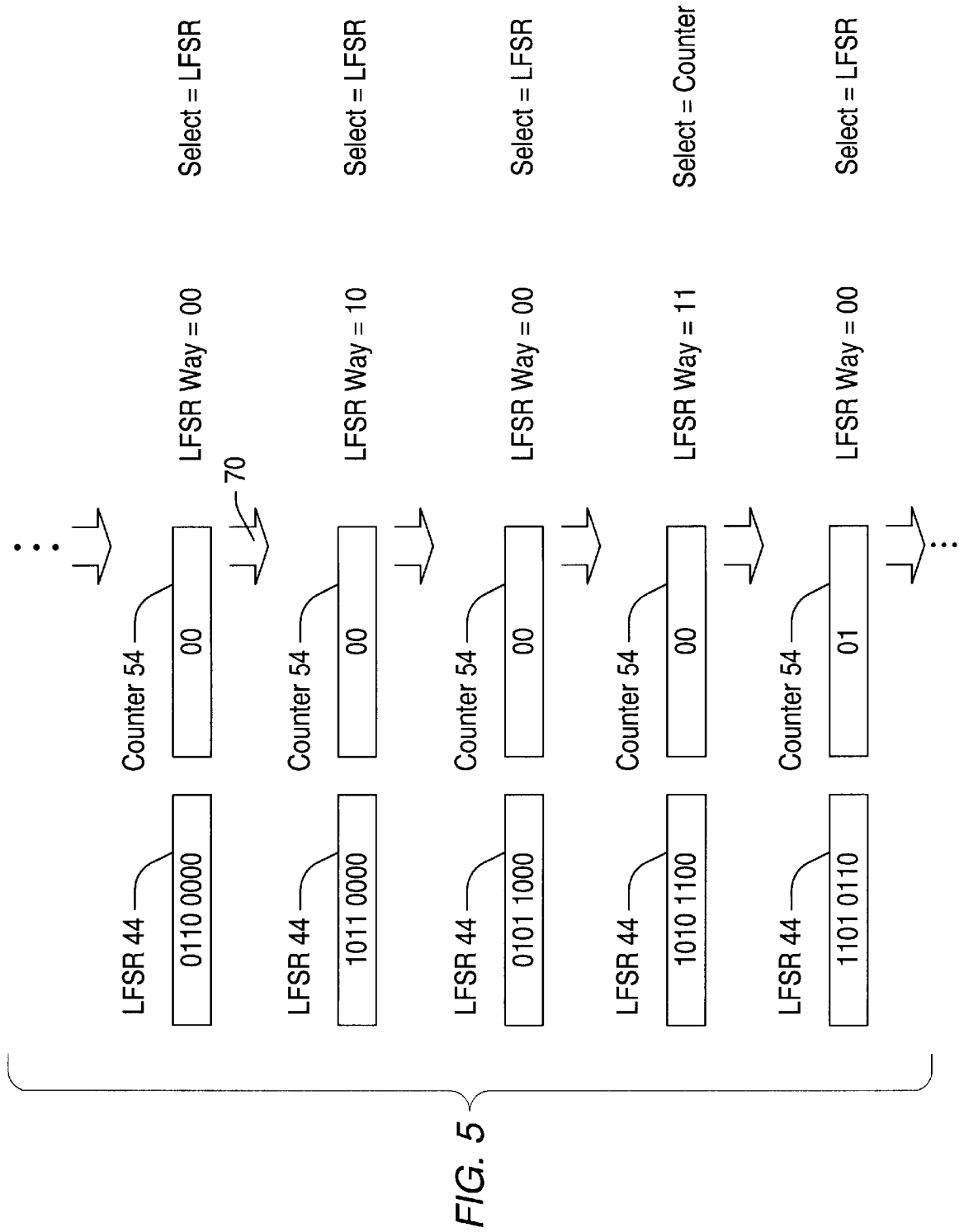
FIG. 5 is an example of the operation of one embodiment of the replacement circuit shown in FIG. 3.

Turning now to FIG. 5, an example of several successive replacement way generations for an embodiment of the replacement circuit 40 is shown. The first replacement way generation is shown at the top of FIG. 5, and successive replacement way generations are shown in order progressing to the bottom on FIG. 5. The state of the LFSR 44 and the counter 54 is shown, as well as the way generated from the LFSR state ("LFSR way" in FIG. 5) and which of the LFSR or counter is selected to provide the replacement way. Each successive replacement way generation is separated from the previous replacement way generation by an arrow (e.g. arrow 70 between the first two replacement way generations.

In the first replacement way generation, the LFSR way is 00 (in binary). Since the LFSR way is one of the ways of L2 cache 14, the LFSR way is selected. Accordingly, the LFSR state is updated for the next way generation but the counter state is not updated. The second and third replacement way generations are similar in that the LFSR way is one of the ways of L2 cache 14 and thus the LFSR way is selected, the LFSR state is updated, and the counter state is not updated. However, in the fourth replacement way generation, the LFSR way is 11 (in binary) and thus the counter way is selected. Therefore, both the counter state and the LFSR state are updated for the fifth replacement way generation. In the fifth replacement way generation, the LFSR way is again one of the ways of the L2 cache and thus the LFSR way is selected.

As FIG. 5 illustrates, replacement circuit 44 may maintain the complex harmonics provided by the LFSR while still generating the way selection within the desired range.

L2 Cache, Second Embodiment

Figure 6:
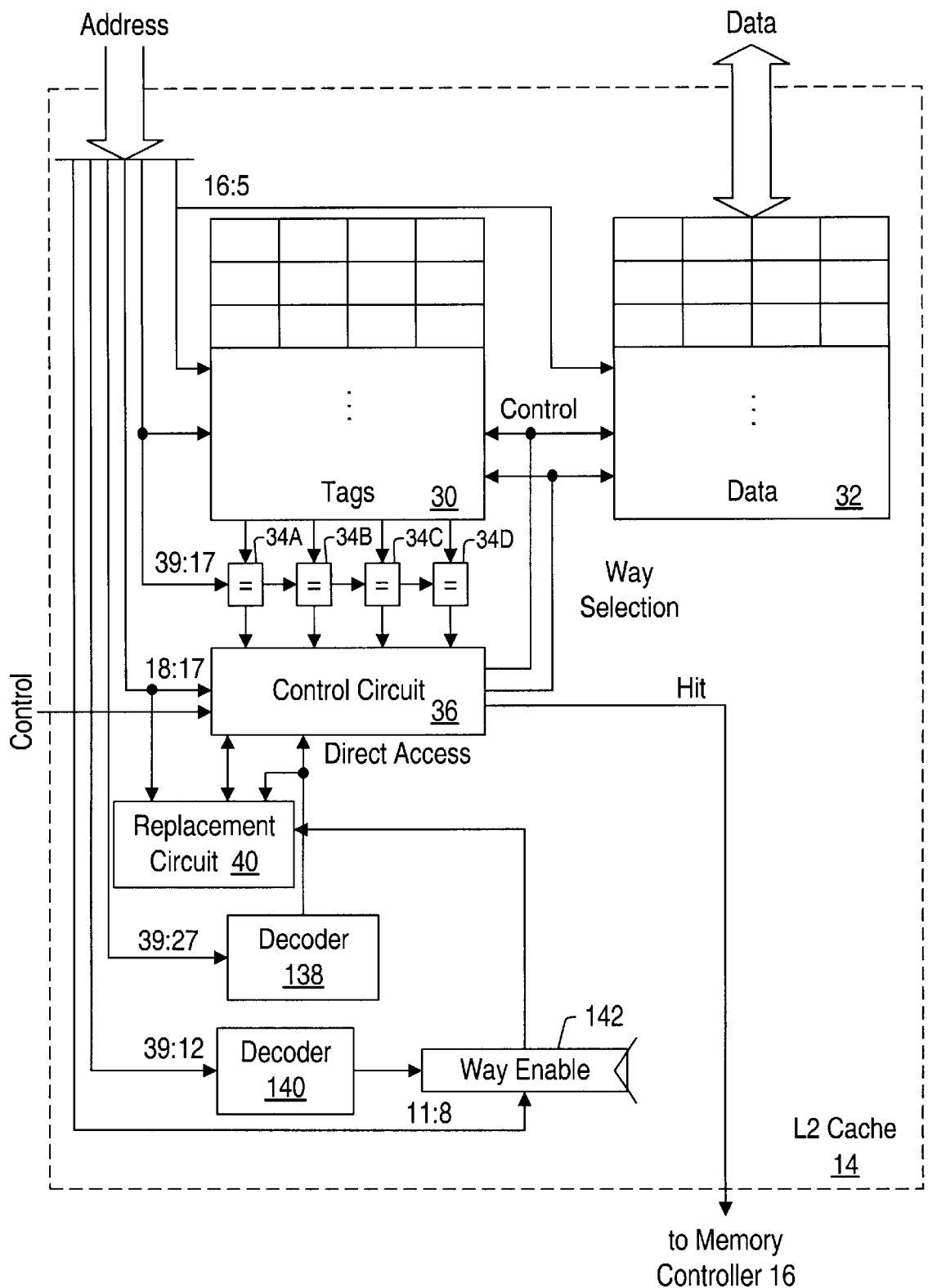
FIG. 6 is a block diagram of a second embodiment of the L2 cache shown in FIG. 1.

Turning now to FIG. 6, a block diagram of a second embodiment of L2 cache 14 is shown. Other embodiments are possible and contemplated. The embodiment of FIG. 6 includes tags memory 30, data memory 32, comparators 34A–34D, control circuit 36, and replacement circuit 40 similar to the embodiment of FIG. 2. However, in this embodiment, the L2 cache is four way set associative. Other embodiments may be N way set associative, as desired. Additionally the embodiment of FIG. 6 may support programmable disabling of ways of the cache by programming a way enable register 142. In the illustrated embodiment, way enable register 142 is coupled to receive input address bits 11:8 and is controlled by a decoder 140 coupled to receive address bits 39:12. Way enable register 142 is further coupled to replacement circuit 40. In the embodiment of FIG. 6, L2 cache 14 also supports direct access transactions with a decoder 138 coupled to receive address bits 39:27 and coupled to provide a direct access signal to replacement circuit 40 and control circuit 36.

The operation of tags memory 30, data memory 32, comparators 34A–34D, control circuit 36, and replacement circuit 40 for the embodiment of FIG. 6 may generally be similar to the like numbered elements of FIG. 2. However, control circuit 36 and replacement circuit 40 may include additional functionality related to the programmability of way enable/disable and direct access transactions, as described in more detail below.

Way enable register 142 stores an indication of which ways are enabled for allocation for memory transactions and which ways are disabled. Thus, when replacement circuit 40 is selecting a way for eviction in response to a cache miss, the disabled ways are not selected. In this manner, the data in the disabled ways is not evicted, and the entries in the disabled ways are not allocated to store data corresponding to the memory transactions which miss. The disabled ways may be accessed using memory transactions which hit the data in the disabled ways or using direct access transactions, depending on the embodiment. Direct access transactions are described in more detail below.

Replacement circuit 40 may employ primary and secondary circuits for generating a random replacement way, similar to the embodiment of FIGS. 2 and 3 above. However, in this embodiment, the effective number of ways included in L2 cache 14 is programmable via the way enable register 142. The primary circuit generates way replacements in the range of the total number of ways of included in L2 cache 14 (e.g. in the range of 0–3 for the illustrated embodiment). Thus, if all ways are enabled, the primary circuit may generate each replacement way. The detector circuit in replacement circuit 40 may receive the way enable indication from way enable register 142 and, if one or more ways are disabled, then the detector circuit may detect the generation of a disabled way as the replacement way from L2 cache 14. If a disabled way is generated, the detector circuit may select the output of the secondary circuit. The secondary circuit may generate values in the range of 0 to M, where M+1 is the number of enabled ways. The value from the secondary circuit may be remapped to a value indicating one of the enabled ways. Alternatively, the second circuit may receive the way enable indication from way enable register 142 and may generate only enabled ways as replacement ways.

The embodiment of FIG. 6 may also support direct access transactions. Direct access transactions may generally be transactions which explicitly specify a set, and a way within the set, for access. In one embodiment, the direct access transactions may be identified by a direct access address space within the addressable range provided by bus 24.

During direct access transactions, control circuit 36 and replacement circuit 40 receive an assertion of the direct access signal from decoder 138. Decoder 138 decodes the address of the transaction to detect that the address is in the direct access address space, and asserts the direct access signal if the address is in the direct access address space. For example, in the illustrated embodiment, the direct access address space may be the addresses having a predetermined combination of address bits 39:27. In one particular implementation, the combination of bits 39:28 may be (in hexadecimal) 00D and bit 27 may be 0. It is noted that the address space may be made smaller by including more of the most significant address bits to decoder 138 (e.g. additional bits below bit position 27) or larger by decoding fewer bits. Furthermore, the selection of an address range for the direct access address space is arbitrary and may be located anywhere in the addressable range, as desired.

In response to the direct access signal, replacement circuit 40 receives the way supplied by the direct access transaction (e.g. address bits 18:17 in the illustrated embodiment) and may update one or both of the primary or secondary circuits to cause the supplied way to be generated for as the next replacement way. In this manner, predictability can be provided even though replacement circuit 40 generally generates a random replacement way.

In response to the direct access signal, control circuit 36 ignores the hit signals from comparators 34A–34D. The direct access transaction is treated as a cache hit. The entry to be accessed (read or written) is explicitly identified by the direct access transaction. For example, in the present embodiment, the same address bits used to index the cache in memory transactions are used to supply the index in a direct access transaction. The way is supplied in other address bits (e.g. more significant address bits than the index). In the illustrated embodiment, the more significant address bits contiguous to the index bits are used to convey the way selection (e.g. address bits 18:17 provided to control circuit 36 and replacement circuit 40). Control circuit 36 provides the way selection indicated by the direct access transaction as the way selection to tags memory 30 and data memory 32.

It is noted that, while direct access transactions are illustrated as providing the index and way in the address in the present embodiment, other embodiments are contemplated. For example, the index and way may be provided on control signals separate from the address. Alternatively, each entry in L2 cache 14 may be assigned an entry number, and the entry number may be communicated by direct access transactions (e.g. as part of the address or on control signals). Still further, direct mapped implementations may use only an index (or entry number) and fully associative embodiments may use only a way (or entry number). Any method for explicitly communicating the selected entry may be used in various implementations of a direct access transaction.

Decoder 140 is provided to detect a write to way enable register 142. Way enable register 142 may be assigned an address within a configuration address space, for example. More particularly, in one embodiment, way enable register 142 may be assigned an address range. The most significant address bits which define the range may be decoded by decoder 140 (e.g. bits 39:12 in the illustrated embodiment) to provide a write enable to way enable register 142. The remaining address bits (e.g. bits 11:8 in the illustrated embodiment) may be used to provide the value to store into way enable register 142. For example, the illustrated embodiment uses a bit for each way. The bit may be set to indicate that the way is enabled and clear to indicate that the way is disabled (or vice versa). In this manner, any number of ways may be enabled or disabled and the ways may be individually enabled and disabled. Thus, a large degree of flexibility in the enabling and disabling of ways may be provided. More particularly, if all the bits are set, then all ways are enabled. Other encodings disable various ways. While the above description detects a write to way enable register 142 via the address and draws the value to be written from the address, other embodiments are possible. For example, the data may be provided as data in the write transaction, on separate control signals from the address, etc.

Any suitable manner for communicating a value to way enable register 142 may be used.

It is noted that, while the embodiment illustrated in FIG. 6 detects direct access transactions via an address space, other embodiments may detect direct access transactions in other ways. For example, an alternative embodiment may employ different encodings on the control signals of bus 24 to identify memory transactions and direct access transactions, if desired.

It is still further noted that other embodiments of L2 cache 14 are contemplated which support programmable disable/enable of ways via way enable register 42 but which do not support direct access translations.

As used herein, the term "register" refers to any clocked storage device. For example, a register may be a flip-flop (or "flop"), a latch, a series of latches, a clocked random access memory (RAM) cell, or any other desirable storage.

Figure 7:
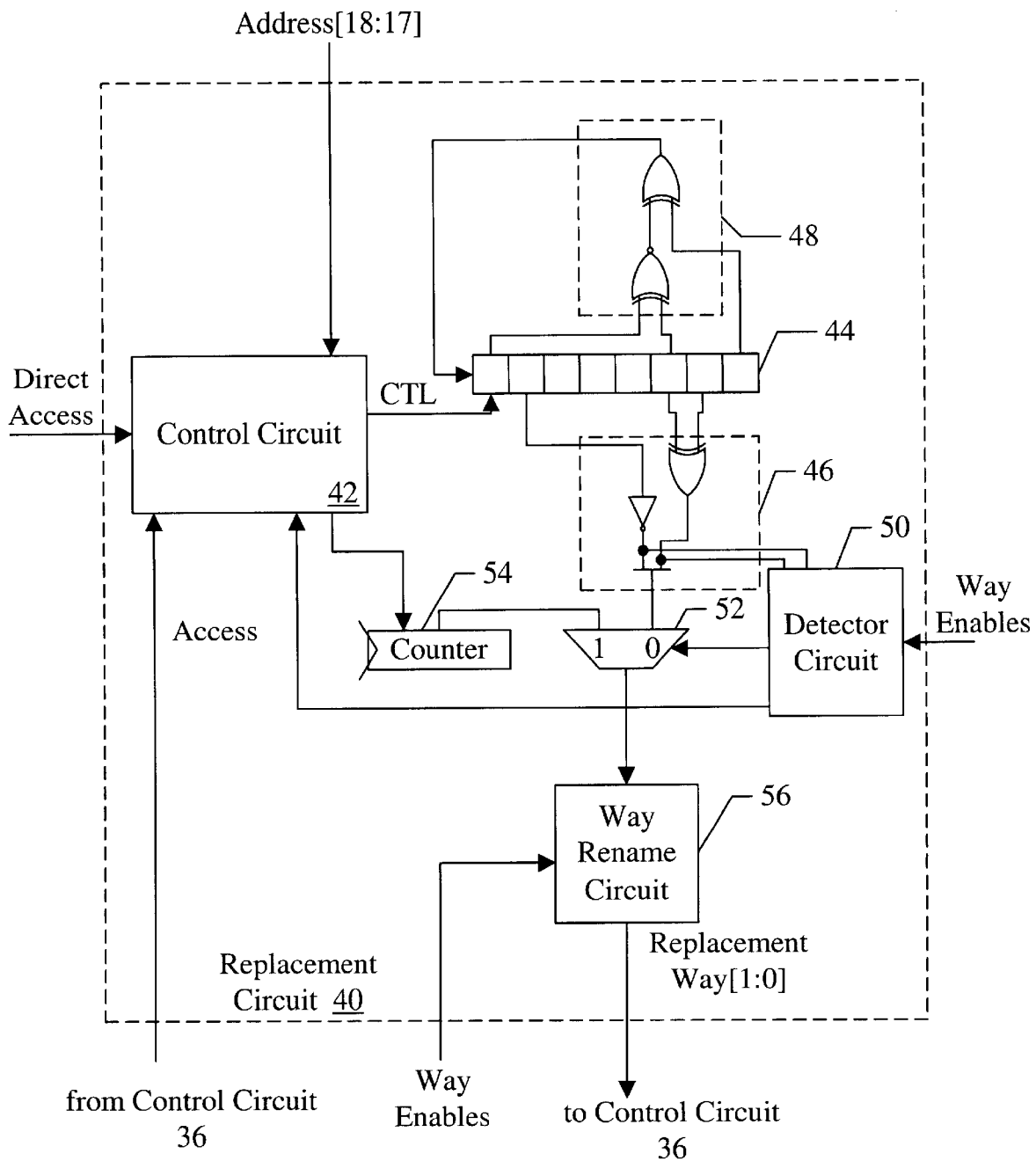
FIG. 7 is a block diagram of one embodiment of a replacement circuit shown in FIG. 6

Turning next to FIG. 7, a block diagram of a second embodiment of replacement control circuit 40 is shown. Other embodiments are possible and contemplated. The embodiment of FIG. 7, similar to the embodiment of FIG. 3, includes a primary circuit comprising register 44, output circuit 46, and next state circuit 48 and a secondary circuit comprising counter 54. The LFSR primary circuit may operate in the same fashion as described above, except that the register 44 may also receive an override value overriding the state generated by operation of the LFSR circuitry in response to a direct access transaction. Additionally, the detector circuit 50 may operate differently based on the way enables provided from way enable register 142. A way rename circuit 56 is also provided, coupled between the output of the mux 52 and the output of the replacement circuit 40 to the control circuit 36. The way rename circuit 56 is coupled to receive the way enables.

More particularly, detector circuit 50 may not be a fixed logic gate detecting a fixed replacement way generated by the output circuit 46, but may instead respond based on the programmable way enables. If all ways are enabled, then the detector circuit 50 detects that any replacement way generated by the output circuit 46 is a way of the L2 cache 14 and selects that replacement way. If one or more ways are disabled, the detector circuit 50 may detect a generation of each disabled way as a replacement way by the output circuit 46 and may instead select the output of the counter 54 as the replacement way. If the output circuit 46 generates an enabled way as the replacement way, the detector circuit 50 may select the replacement way from output circuit 46 as the replacement way. In one embodiment, the detector circuit 50 may rename the enabled ways as ways 0 through M, where M+1 is the number of enabled ways. If the replacement way supplied by the output circuit 46 is greater than M, then the detector circuit 50 may select the output of the counter 54 as the replacement way.

Furthermore, counter 54 may be modified to increment through a range of values representing only the enabled ways. For example, the counter 54 may increment from 0 to M. Alternatively, the counter 54 may be configured to increment through the enabled ways. In other words, the counter 54 may be configured to increment, at any given point, to the next higher way which is enabled. Pseudocode for such an alternative of the counter 54 is provided below, using the same definition of Counter[n] and Next_Counter[n] as in the description of FIG. 3:

```
Case Counter[1:0] of
    00: If way_enables[1] then Next_counter[1:0] = 01
        else if way_enables[2] then Next_counter[1:0] = 10
        else if way_enables[3] then Next_counter[1:0] = 11
        else Next_counter[1:0] = 00;
    01: If way_enables[2] then Next_counter[1:0] = 10
        else if way_enables[3] then Next_counter[1:0] = 11
        else if way_enables[0] then Next_counter[1:0] = 00
        else Next_counter[1:0] = 01;
    10: If way_enables[3] then Next_counter[1:0] = 11
        else if way_enables[0] then Next_counter[1:0] = 00
        else if way_enables[1] then Next_counter[1:0] = 01
        else Next_counter[1:0] = 10;
    11: If way_enables[0] then Next_counter[1:0] = 00
        else if way_enables[1] then Next_counter[1:0] = 01
        else if way_enables[2] then Next_counter[1:0] = 10
        else Next_counter[1:0] = 11;
End Case
```

The way rename circuit 56 is configured to rename the way supplied by mux 52 to one of the enabled ways, thus supplying the replacement way to the control circuit 56. Viewed in another way, the way rename circuit 56 may provide the opposite renaming function to that performed in the detector circuit 50. For example, if way 0 is disabled, then the way rename circuit 56 renames the output of mux 52 as follows: If the output of mux 52 is a 0, the output is renamed to way 1. If the output of mux 52 is a 1, the output is renamed to way 2. If the output of mux 52 is a 2, the output is renamed to way 3. As another example, if way 1 is disabled, then the way rename circuit 56 renames the output of mux 52 as follows: If the output of mux 52 is a 0, the output is renamed to way 0 (i.e. no change in the name). If the output of mux 52 is a 1, the output is renamed to way 2. If the output of mux 52 is a 2, the output is renamed to way 3. More than one way may be disabled. Generally, the output 0 is renamed to the lowest-numbered enabled way, the output 1 is renamed to the second-lowest numbered enabled way, etc. It is noted that, in some embodiments, the detector circuit 50 and the way rename circuit 56 may not rename the output of the output circuit 46. Since the random numbers generated by the output circuit 46 may occur with relatively equal frequencies over time, the output may be treated as a way number. However, if the counter 54 is to count from 0 to M, then the output of the mux 52 is renamed if the output is selected from the counter 54.

If a direct access transaction is received (signalled via the direct access signal from decoder 138), control circuit 42 overrides the value in register 44 with a predetermined value. The predetermined value represents a state in register 44 which generates a particular way as the replacement way to control circuit 36. The particular way is the way indicated by the direct access transaction, which is received by control circuit 42 (address bits 18:17). Accordingly, control circuit 42 may select the predetermined value from one of a set of predetermined values (one for each way of L2 cache 14). The predetermined value is provided to register 44 (override [7:0] in FIG. 7), and control circuit 42 asserts a control signal to register 44 causing register 44 to update with the predetermined value.

It is noted that, rather than using direct access transactions to set the state of replacement circuit 40, other transactions may be used. For example, register 44 may be memory mapped, and a memory mapped write to register 44 may set the state. Alternatively, the memory mapped write may provide the desired way, and the corresponding state may be set. In yet another example, a dedicated bus command may be used to convey the state or desired way.

Figure 8:
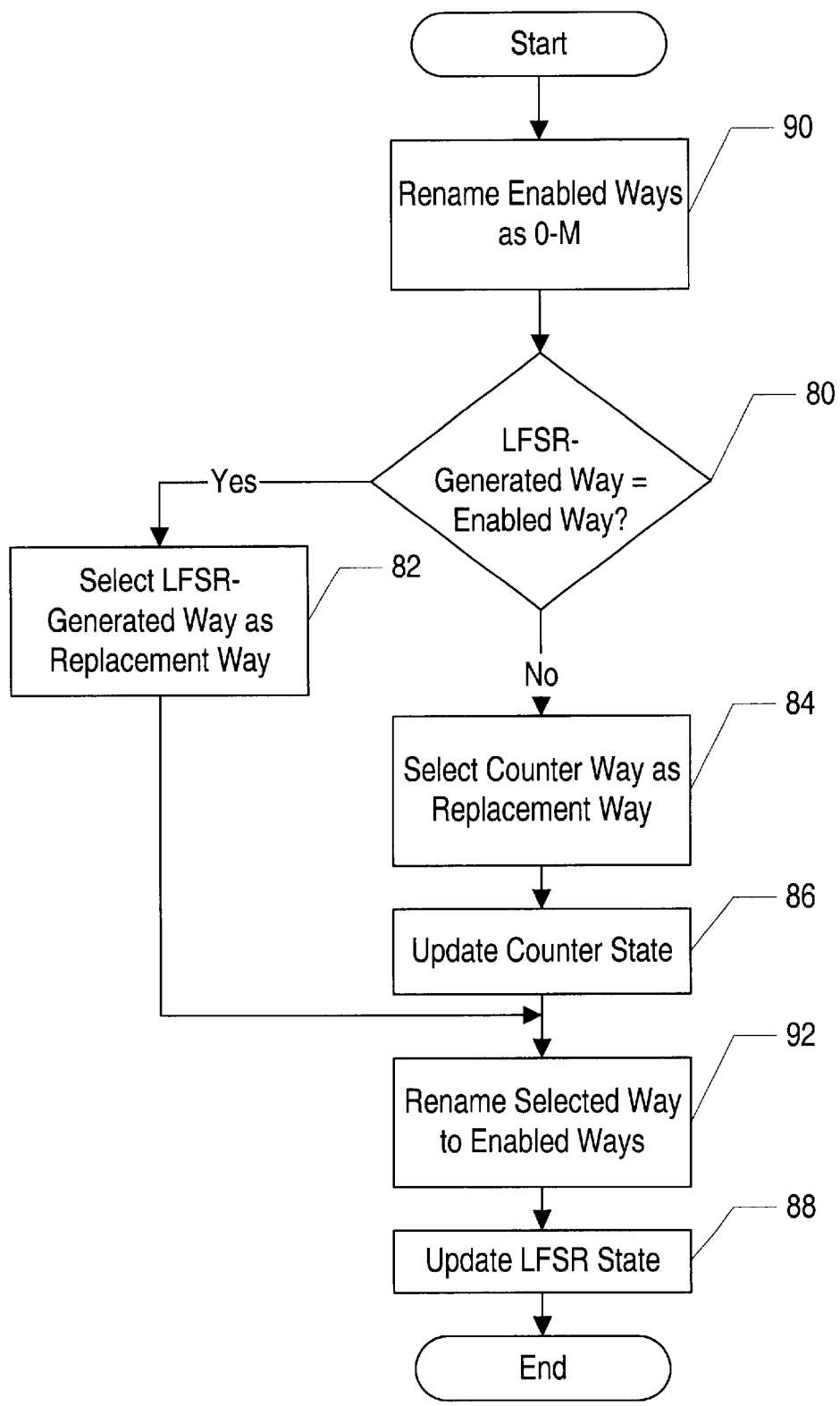
FIG. 8 is a flowchart illustrating operation of one embodiment of a replacement circuit shown in FIG. 7.

Turning next to FIG. 8, a flowchart is shown illustrating operation of one embodiment of the replacement circuit 40 of FIG. 7. Other embodiments are possible and contemplated. While the blocks shown in FIG. 8 are illustrated in a particular order for ease of understanding, any order may be used. Furthermore, blocks may be performed in parallel in combinatorial logic circuitry within the replacement circuit 40.

The detector circuit 50 may rename the enabled ways as 0 to M, where M+1 is the number of enabled ways (block 90). Viewed in another way, the detector circuit 50 may determine a contiguous range of possible values, beginning with zero, which are considered to be valid ways selected by the LFSR circuit.

The detector circuit 50 determines if the LFSR-generated replacement way is an enabled way (decision block 80). In other words, for the illustrated embodiment, the detector circuit 50 may determine if the LFSR-generated replacement way is in the range of 0 to M. If the LFSR-generated replacement way is enabled, the detector circuit 50 selects the LFSR-generated replacement way through mux 52 (block 82). On the other hand, if the LFSR-generated replacement way is not enabled, the detector circuit 50 selects the counter-generated way as the replacement way through mux 52 (block 84) and updates the state of the counter to select the next enabled way (block 86). In either case, the LFSR state is updated block 88).

The selected way is renamed (e.g. by the way rename circuit 56) to one of the enabled ways (block 92). Generally, the operation of block 92 may be to map the selected value of zero to the lowest-numbered enabled way, the selected value of one to the second lowest-numbered enabled way, etc.

As mentioned above, other embodiments of the replacement circuit 40 may not rename the enabled ways for determining if the LFSR-generated way is an enabled way. Thus, block 90 is optional. In such embodiments, block 92 may be performed if the counter way is selected (e.g. the arrow from block 82 may be connected between block 92 and block 88). Furthermore, in other embodiments, the counter may count through the enabled ways. In such an embodiment, block 92 may be eliminated as well.

While the above description has referred to updating the counter when the output of the counter is used to select the replacement way, other embodiments may update the counter each time a replacement way is selected (from either source) or each access of the cache, as desired.

Figure 9:
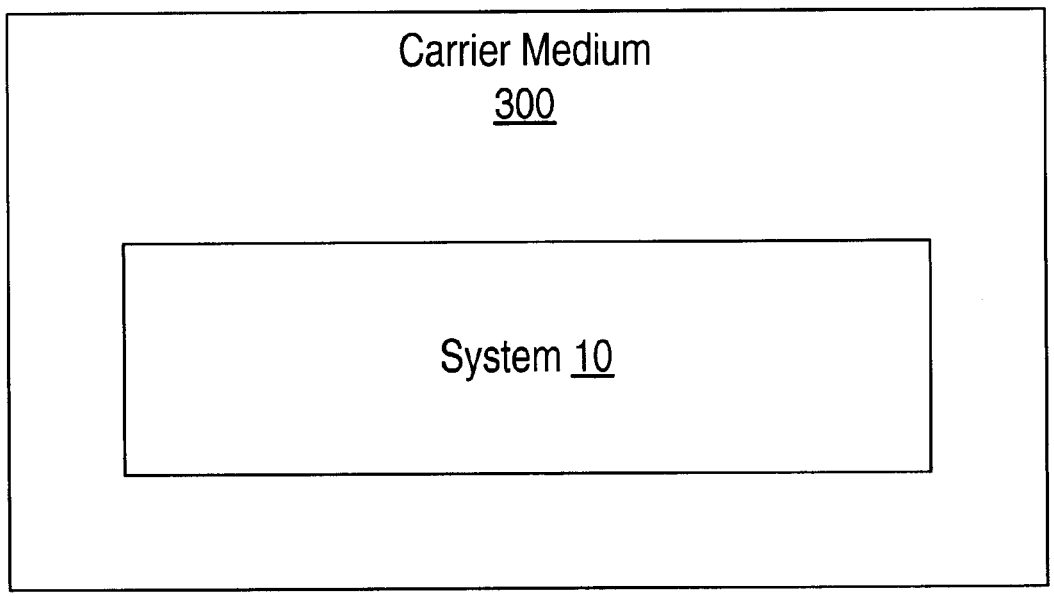
FIG. 9 is a block diagram of a carrier medium.

Turning next to FIG. 9, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any combination of a random number generator circuit, a replacement circuit, a cache, etc.

Numerous variations and modifications will become apparent to those skilled in the art once the above disclosure is fully appreciated. It is intended that the following claims be interpreted to embrace all such variations and modifications.

What is claimed is:

1. A circuit comprising:
   a first circuit configured to generate a first value to be used for a replacement way for a cache, the first value to be within a first range of values that can exceed replacement ways available to the cache;
   a second circuit configured to generate a second value to be used for a replacement way for the cache, the second value to be within a second range of values that do not exceed the replacement ways available to the cache, the second range of values encompassed by the first range of values; and
   a detector circuit coupled to receive the first value and the second value, wherein the detector circuit to select the first value if the first value is within the replacement ways available for the cache, but if the first value is not within the replacement ways available for the cache, then to select the second value.

2. The circuit as recited in claim 1 wherein the second range excludes at least one value that is within the first range.

3. The circuit as recited in claim 1 wherein the first circuit includes a linear feedback shift register (LFSR) to generate the first value.

4. The circuit as recited in claim 3 wherein the second circuit includes a counter to generate values in the second range.

5. The circuit as recited in claim 4 further comprising a control circuit coupled to the second circuit, to increment the counter to generate the second value.

6. The circuit as recited in claim 5 wherein the control circuit is coupled to the first circuit to cause the LFSR to update.

7. The circuit as recited in claim 1 wherein the first range is a range determined by a power of two.

8. A cache comprising:
   a memory array in an N way set associative configuration, N being a positive integer greater than 1; and
   a replacement circuit coupled to select a replacement way of the N ways, the replacement circuit comprising:
      a first circuit configured to generate a first value to be used for a replacement way for a cache, the first value to be within a range of values that exceed N ways;
      a second circuit configured to generate a second value to be used for a replacement way for the cache, the second value to be within a range of values that do not exceed N ways; and a detector circuit coupled to receive the first value and the second value, wherein the detector circuit to select the first value if the first value is within N ways, but if the first value is not within N ways, then to select the second value.

9. The cache as recited in claim 8 wherein the first circuit includes a linear feedback shift register (LFSR) to generate the first value.

10. The cache as recited in claim 9 wherein the second circuit includes a counter to count the N ways.

11. The cache as recited in claim 10 further comprising a control circuit coupled to the second circuit to generate the second value.

12. The cache as recited in claim 11 wherein the control circuit is coupled to the first circuit to cause the LFSR to update.

13. The cache as recited in claim 8 wherein the first circuit to generate the first value in a range determined by a power of two.

14. The cache as recited in claim 13 wherein N is not an integer of a power of two.

15. The cache as recited in claim 8 wherein N is not an integer of a power of two.

16. The cache as recited in claim 13 wherein N is equal to a power of two, and wherein the cache comprises a register configured to store a value indicative of which of the N ways is enabled for use.

17. The cache as recited in claim 15 wherein the range of values selectable as a replacement way excludes those which are not enabled for use.

18. A method comprising:

generating a first value to be used for a replacement way for a cache, the first value to be within a first range of values that can exceed replacement ways available to the cache;

generating a second value to be used for a replacement way for the cache, the second value to be within a second range of values that do not exceed the replacement ways available to the cache, the second range of values encompassed by the first range of values;

detecting if the first value is within the replacement ways available for the cache; and selecting the first value if the first value is within the replacement ways available for the cache, but if the first value is not within the replacement ways available for the cache, then selecting the second value.

19. The method as recited in claim 18 wherein the generating the first value includes generating the first value responsive to a value in a linear feedback shift register (LFSR).

20. The method as recited in claim 19 wherein the generating the second value includes generating the second value responsive to a counter counting through values in the second range.

21. The method as recited in claim 20 further comprising incrementing the counter responsive to selecting the second value.

22. The method as recited in claim 18 wherein the first range spans a number of values determined by a power of two.

* * * * *

UNITED STATES PATENT AND TRADEMARK OFFICE
CERTIFICATE OF CORRECTION

PATENT NO. : 6,748,495 B2
APPLICATION NO. : 09/858804
DATED : June 8, 2004
INVENTOR(S) : Joseph Rowlands et al.

It is certified that error appears in the above-identified patent and that said Letters Patent is hereby corrected as shown below:

Title Page, Item (54): The title should appear as follows: --Random generator for pseudo random replacement way for a cache--.

Column 1, line 1: The title should appear as follows: --Random generator for pseudo random replacement way for a cache--.

Signed and Sealed this

Eighteenth Day of November, 2008

JON W. DUDAS
*Director of the United States Patent and Trademark Office*